United States Patent
Wang et al.

(10) Patent No.: US 11,134,410 B2
(45) Date of Patent: Sep. 28, 2021

(54) QUALITY OF SERVICE (QOS) CONTROL IN MOBILE EDGE COMPUTING (MEC)

(71) Applicant: Nokia Solutions and Networks Oy, Espoo (FI)

(72) Inventors: Zhi Wang, Qingdao (CN); Yigang Cai, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/956,236

(22) PCT Filed: Dec. 25, 2017

(86) PCT No.: PCT/CN2017/118269
§ 371 (c)(1),
(2) Date: Jun. 19, 2020

(87) PCT Pub. No.: WO2019/126931
PCT Pub. Date: Jul. 4, 2019

(65) Prior Publication Data
US 2021/0076250 A1    Mar. 11, 2021

(51) Int. Cl.
*H04W 28/02* (2009.01)
*H04W 28/24* (2009.01)
(Continued)

(52) U.S. Cl.
CPC ... *H04W 28/0268* (2013.01); *H04W 28/0221* (2013.01); *H04W 28/0231* (2013.01);
(Continued)

(58) Field of Classification Search
CPC ......... H04W 28/0215; H04W 28/0221; H04W 28/0231; H04W 28/0268; H04W 28/16;
(Continued)

(56) References Cited

U.S. PATENT DOCUMENTS 8,339,954 B2 * 12/2012 Dahod ............... H04L 47/70
370/231
8,913,494 B1 * 12/2014 Marupaduga ......... H04L 47/525
370/230
(Continued)

FOREIGN PATENT DOCUMENTS

| CN | 107018534 A | 8/2017 |
| WO | 2017/194080 A1 | 11/2017 |
| WO | 2017/211377 A1 | 12/2017 |

OTHER PUBLICATIONS

"3rd Generation Partnership Project; Technical Specification Group Services and System Aspects; Procedures for the 5G System; Stage 2 (Release 15)", 3GPP TS 23.502, V1.3.0, Nov. 2017, pp. 1-215.
(Continued)

*Primary Examiner* — Kevin D Mew
(74) *Attorney, Agent, or Firm* — Nokia Technologies Oy (57) ABSTRACT

Systems, methods, and software for controlling Quality of Service (QoS) selection in Mobile Edge Computing (MEC) services. In one embodiment, a MEC server is at a Radio Access Network (RAN), and implements edge applications that provide the MEC services. The MEC server queries a core network for a QoS policy for a mobile device that indicates QoS profile options for the mobile device, and receives the QoS policy from the core network. The MEC server monitors for a triggering event that triggers selection of a QoS profile, selects the QoS profile from the QoS profile options for a user plane connection established for a MEC service between the mobile device and an edge application in response to the triggering event, and provides a QoS profile identifier for the QoS profile to a base station in the RAN to enforce the QoS profile on the user plane connection.

20 Claims, 9 Drawing Sheets

(51) Int. Cl.
*H04W 72/08* (2009.01)
*H04W 72/12* (2009.01)

(52) U.S. Cl.
CPC ......... *H04W 28/24* (2013.01); *H04W 72/087* (2013.01); *H04W 72/1263* (2013.01)

(58) Field of Classification Search
CPC ..... H04W 28/18; H04W 28/24; H04W 72/08; H04W 72/082; H04W 72/085; H04W 72/087; H04W 72/1226; H04W 72/1231; H04W 72/1236; H04W 72/1263
See application file for complete search history.

(56) References Cited

U.S. PATENT DOCUMENTS

| | | | | |
|---|---|---|---|---|
| 9,301,191 | B2 * | 3/2016 | Sachdev | H04W 28/0268 |
| 2003/0108015 | A1 * | 6/2003 | Li | H04W 28/24 370/338 |
| 2006/0029096 | A1 * | 2/2006 | Babbar | H04W 28/24 370/466 |
| 2009/0225762 | A1 * | 9/2009 | Davidson | H04L 67/32 370/401 |
| 2012/0030331 | A1 * | 2/2012 | Karampatsis | H04W 24/02 709/223 |
| 2014/0160990 | A1 * | 6/2014 | Sachdev | H04L 41/5019 370/259 |
| 2015/0085664 | A1 * | 3/2015 | Sachdev | H04L 41/5019 370/236 |
| 2017/0048876 | A1 | 2/2017 | Mahindra et al. | |
| 2018/0198867 | A1 * | 7/2018 | Dao | H04W 36/0033 |
| 2019/0313275 | A1 * | 10/2019 | Chen | H04W 28/24 |

OTHER PUBLICATIONS

"3rd Generation Generation Partnership Project; Technical Specification Group Services and System Aspects; System Architecture for the 5G System; Stage 2 (Release 15)", 3GPP TS 23.501, V1.5.0, Nov. 2017, pp. 1-170.

International Search Report and Written Opinion received for corresponding Patent Cooperation Treaty Application No. PCT/CN2017/118269, dated Jul. 30, 2018, 9 pages.

Pencheva et al., "Mobile Edge Computing Services for Dynamic Quality of Service Control", 20th Conference of Open Innovations Association (FRUCT), Apr. 3-7, 2017, pp. 365-370.

"Role of the Common UP-GW in Case of Multi-Homed (IPv6) PDU Session", SA WG2 Meeting #116, S2-164251, Agenda: 6.10.4, Nokia, Jul. 11-15, 2016, pp. 1-4.

"3rd Generation Partnership Project; Technical Specification Group Core Network and Terminals; 5G System—Phase 1; CT WG4 Aspects (Release 15)", 3GPP TR 29.891, V0.4.0, Aug. 2017, pp. 1-132.

Extended European Search Report received for corresponding European Patent Application No. 17936033.4, dated Jul. 21, 2021, 5 pages.

* cited by examiner

QUALITY OF SERVICE (QOS) CONTROL IN MOBILE EDGE COMPUTING (MEC)

FIELD OF THE INVENTION

The invention is related to the field of communication systems and, in particular, to Mobile Edge Computing (MEC).

BACKGROUND

MEC is a technology that enables Information Technology (IT) services and cloud computing services at the edge of a mobile network (i.e., within the Radio Access Network (RAN)) and in close proximity to mobile subscribers. MEC is considered a key emerging technology for Fifth Generation (5G) networks, as processing capability at the edge of the network (e.g., inside or adjacent to a base station, a WiFi hotspot server, etc.) allows for lower latency and efficient service delivery. A MEC platform is typically a virtualized platform that hosts one or more MEC applications. The MEC applications may operate on downstream data from a core network, and/or on upstream data from mobile devices.

The growth of mobile traffic and pressure on costs are driving a need to implement several changes in order to maintain quality of experience, to generate revenue, and optimize network operations and resource utilization.

SUMMARY

Embodiments described herein provide mechanisms for controlling Quality of Service (QoS) for MEC services provided to mobile devices serviced by a RAN. A MEC server of a RAN implements one or more edge applications that provide MEC services to mobile devices in the RAN. MEC is deployed within the RAN to improve the user experience and more effectively handle latency-sensitive services instead of relying on a core network to provide the services. Providing the MEC services in the RAN allows for service delivery to be adapted according to the load on the RAN, and can reduce the need for long distance backhaul to the core network. A MEC server, as described herein, acquires a QoS policy from the core network for a mobile device. Based on the QoS policy, the MEC server is able to select QoS profiles for MEC services accessed by the mobile device. Thus, QoS profile selection is performed in the RAN instead of relying on the core network to select the QoS profile for each individual MEC service accessed by a mobile device. QoS profile selection in the RAN is advantageous because the MEC server is privy to load conditions in the RAN, an identity of edge applications that provide the MEC services, costs/rates of the MEC services, battery level or other conditions regarding the mobile devices, etc.

One embodiment comprises a MEC server implemented at a RAN of a mobile network that includes a base station. The MEC server includes a memory, and a controller configured to implement one or more edge applications configured to provide MEC services to a mobile device in range of the base station. The controller is configured to implement a policy manager configured to query a core network of the mobile network for a QoS policy for the mobile device that indicates a plurality of QoS profile options for the mobile device, to receive the QoS policy from the core network, and to store the QoS policy in the memory. The controller is also configured to implement a QoS selector configured to monitor for a triggering event that triggers selection of a QoS profile, to select the QoS profile from the QoS profile options for a user plane connection established for a MEC service between the mobile device and an edge application in response to the triggering event, and to provide a QoS profile identifier for the QoS profile to the base station to enforce the QoS profile on the user plane connection.

In another embodiment, the QoS selector is configured to assign a validity timer to the QoS profile.

In another embodiment, the triggering event comprises expiration of the validity timer for a previously-selected QoS profile.

In another embodiment, the triggering event comprises a change in network conditions within the RAN.

In another embodiment, the triggering event comprises a determination in the QoS selector that a battery level in the mobile device drops below a threshold.

In another embodiment, the QoS selector is configured to send a notification to the mobile device indicating the QoS profile identifier.

In another embodiment, the QoS selector is configured to send a notification to the mobile device indicating the QoS profile options, to receive a response from the mobile device selecting one of the QoS profile options, and to select the QoS profile based on the one of the QoS profile options selected by the mobile device.

Another embodiment comprises a method operable in a MEC server. The method comprises querying a core network of the mobile network for a QoS policy for the mobile device that indicates a plurality of QoS profile options for the mobile device, receiving the QoS policy from the core network, storing the QoS policy in the memory, monitoring for a triggering event that triggers selection of a QoS profile, selecting the QoS profile from the QoS profile options for a user plane connection established for a MEC service between the mobile device and an edge application in response to the triggering event, and providing a QoS profile identifier for the QoS profile to the base station to enforce the QoS profile on the user plane connection.

In another embodiment, the method further comprises assigning a validity timer to the QoS profile.

In another embodiment, the method further comprises sending a notification to the mobile device indicating the QoS profile identifier.

In another embodiment, the step of selecting the QoS profile comprises sending a notification to the mobile device indicating the QoS profile options, receiving a response from the mobile device selecting one of the QoS profile options, and selecting the QoS profile based on the one of the QoS profile options selected by the mobile device.

Another embodiment comprises a non-transitory computer readable medium embodying programmed instructions executed by one or more processors, wherein the instructions direct the processors to implement a MEC server implemented at a RAN of a mobile network that includes a base station. The MEC server implements one or more edge applications configured to provide MEC services to a mobile device in range of the base station. The MEC server queries a core network of the mobile network for a QoS policy for the mobile device that indicates a plurality of QoS profile options for the mobile device, receives the QoS policy from the core network, and stores the QoS policy in the memory. The MEC server monitors for a triggering event that triggers selection of a QoS profile, selects the QoS profile from the QoS profile options for a user plane connection established for a MEC service between the mobile device and an edge application in response to the triggering event, and provides a QoS profile identifier for the QoS profile to the base station to enforce the QoS profile on the user plane connection.

Another embodiment comprises a MEC server implemented at a RAN of a mobile network that includes a base station. The MEC server includes a means for implementing one or more edge applications configured to provide MEC services to a mobile device in range of the base station. The MEC server includes a means for querying a core network of the mobile network for a QoS policy for the mobile device that indicates a plurality of QoS profile options for the mobile device, a means for receiving the QoS policy from the core network, and a means for storing the QoS policy in the memory. The MEC server also includes a means for monitoring for a triggering event that triggers selection of a QoS profile, a means for selecting the QoS profile from the QoS profile options for a user plane connection established for a MEC service between the mobile device and an edge application in response to the triggering event, and a means for providing a QoS profile identifier for the QoS profile to the base station to enforce the QoS profile on the user plane connection.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
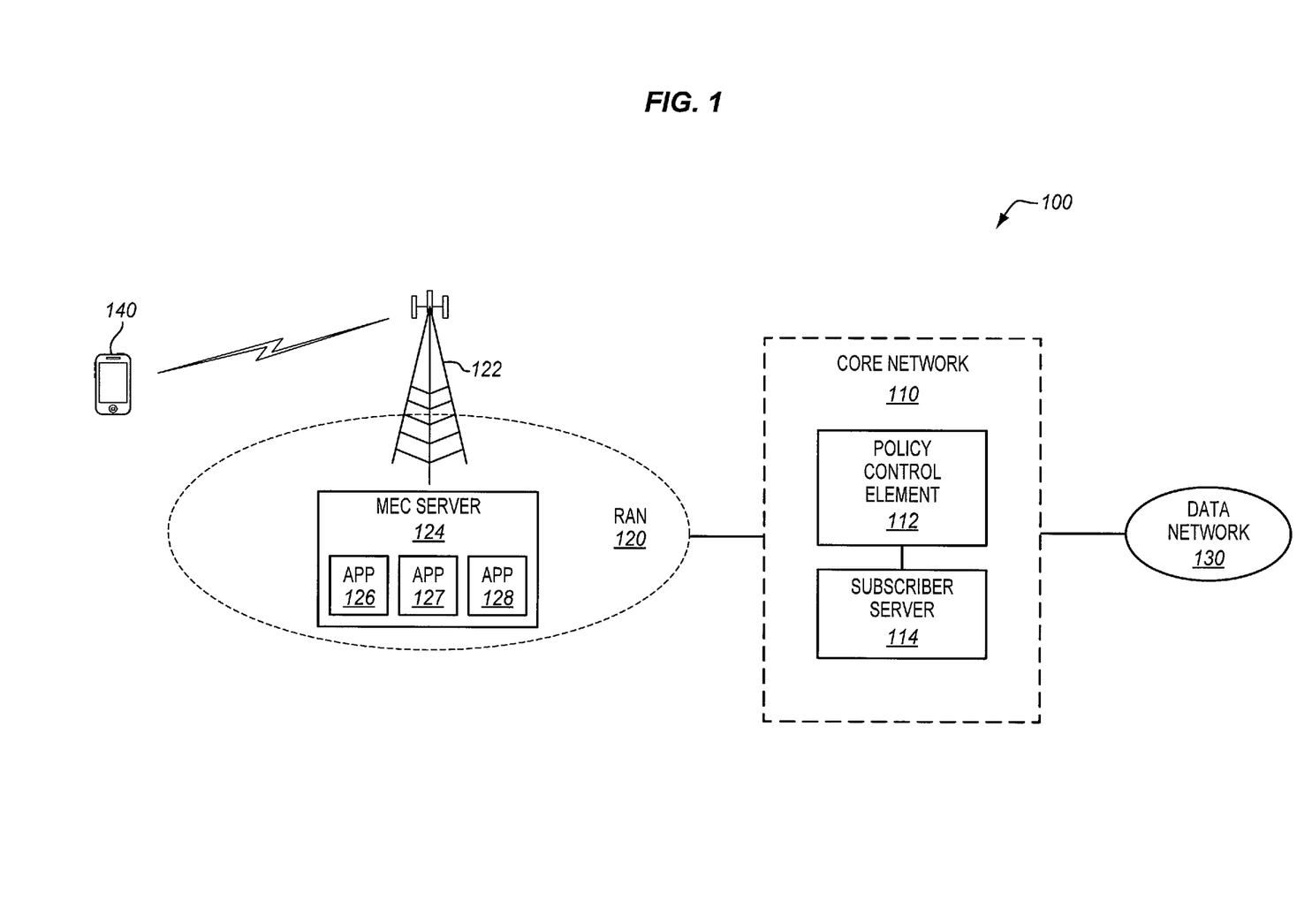
FIG. 1 illustrates a mobile network in an illustrative embodiment.

FIG. 1 illustrates a mobile network 100 in an illustrative embodiment. Mobile network 100, which may also be referred to as a cellular network, is a type of communication network where the last link to end user devices is wireless. Mobile network 100 may represent a next generation network, such as a 5G network. In this embodiment, mobile network 100 includes a core network 110 and a Radio Access Network (RAN) 120. Core network 110 is the central part of mobile network 100 that provides various services to subscribers who connect to core network 110 via RAN 120. Core network 110 may include a Session Management Function (SMF), a User Plane Function (UPF), etc., in a next generation example. In this embodiment, core network 110 includes a policy control element 112 and a subscriber server 114. Policy control element 112 comprises a network device, physical node, or virtual function configured to provide policy control for mobile network 100. One example of policy control element 112 is a Policy Control Function (PCF) of a next generation network. Subscriber server 114 comprises a network device, physical node, or virtual function configured to store service plans for end users. One example of subscriber server 114 is a Home Subscriber Server (HSS) and/or a Unified Data Management (UDM) element of a next generation network. Core network 110 is shown as connecting to one or more external data networks 130 also referred to as Packet Data Networks (PDN). External data networks 130 may include an operator external public or private data network, or an intra-operator data network (e.g., for IMS services).

RAN 120 is a network that implements a radio access technology to connect mobile devices to core network 110. RAN 120 may support Evolved-UMTS Terrestrial Radio Access Network (E-UTRAN) access, Wireless Local Area Network (WLAN) access, fixed access, satellite radio access, new Radio Access Technologies (RAT), etc. In this embodiment, RAN 120 includes one or more base stations 122. A base station 122 is an access network element/node in RAN 120 that handles radio communications with mobile devices using antennas as typically mounted on a tower. One example of RAN 120 is an E-UTRAN having one or more Evolved-NodeBs (eNodeB) (i.e., base stations). Base station 122 has a service area that is referred to as a cell. Mobile devices or User Equipment (UE) that are located within the cell are able to communicate with base station 122 over the air interface, which is the communication link between a mobile device and a base station. A mobile device 140 located within the cell is able to attach to RAN 120 and access services provided by core network 110. A mobile device 140 is a device used directly by an end user, such as a phone, a tablet, a computer with a mobile broadband adapter, etc. Mobile device 140 may communicate with base station 122 via the LTE Uu interface, which is the air interface between a mobile device and an eNodeB, or via another interface (e.g., a next generation interface). Base station 122 may communicate with core network 110 through one or more S1 interfaces or N2/N3 in 5G interfaces.

In this embodiment, MEC is implemented in RAN 120. MEC is a technology that enables the deployment of services (e.g., IT services and cloud services) within RAN 120 to more effectively provide latency-sensitive services and improve user experience. To implement MEC, compute capabilities are implemented at one or more base stations 122 of RAN 120. For instance, a MEC server 124 is implemented at base station 122 of RAN 120, and is configured to provide MEC services to mobile devices (e.g., mobile device 140) in range of base station 122. When referred to as being implemented "at" base station 122, MEC server 124 may be part of base station 122 (i.e., part of the controller of base station 122) or may be an external server deployed between base station 122 and core network 110, such as on the S1 interface. MEC server 124 hosts, executes, or runs one or more edge applications (APP) 126-128. An edge application is an application that provides a MEC service to one or more mobile devices in range of base station 122 as opposed to core network 110 providing the MEC service. Thus, mobile device 140 may be in communication with one or more of edge applications 126-128 in MEC server 124 when receiving a MEC service from mobile network 100, and the MEC service does not have to be provided by a network element within core network 110. This allows for MEC services to be provided with lower latency as the MEC services are provided by RAN 120 as opposed to core network 110.

Communications between mobile device 140 and MEC server 124 may be divided into control plane transmissions and user plane transmissions. The control plane is a network plane that carries signaling traffic, and the user plane (also referred to as the data plane, forwarding plane, or bearer plane) is the network plane that carries user data traffic, such as voice and data traffic. User data traffic (downlink (DL) and/or uplink (UL)) is carried on data radio bearers (DRB) of the user plane between base station 122 and mobile device 140. A DRB is a virtual connection between two endpoints for transporting traffic based on a set of attributes over the air interface.

As an overview of the embodiments described herein, mobile device 140 attaches to RAN 120 and registers with core network 110. A session may be established between mobile device 140 and core network 110, such as a Packet Data Unit (PDU) session. The session may be initiated by mobile device 140, or a network may initiate the session via a device trigger message. An example of session establishment procedures in next generation networks may be found in 3GPP TS 23.502 (version 1.3.0), which is incorporated by reference as if fully included herein. Within a session, mobile device 140 may initiate service request procedures to request a MEC service, such as to send uplink data. A service request procedure for next generation networks is used to activate/establish a user plane connection for a session. When MEC is implemented as in the present embodiment, the user plane connection for a MEC service is between mobile device 140 and an edge application 126-128 of MEC server 124 instead of between mobile device 140 and a UPF of a core network (e.g., core network 110). MEC server 124 may also initiate service request procedures to request a MEC service, such as to send DL data to mobile device 140. Either way, a user plane connection is established between mobile device 140 and an edge application 126-128 in response to a service request procedure. And, multiple service request procedures may be performed during a session to establish multiple user plane connections between mobile device 140 and one or more edge applications 126-128 in MEC server 124.

In the embodiments described herein, MEC server 124 selects a QoS for the user plane connections established for mobile device 140 (and other mobile devices served by RAN 120) for MEC services. MEC server 124 obtains a QoS policy from core network 110, and selects the QoS for user plane connections based on the QoS policy. Thus, the QoS for individual user plane connections in RAN 120 is actually selected within RAN 120 (i.e., by MEC server 124) instead of being selected by core network 110.

Figure 2:
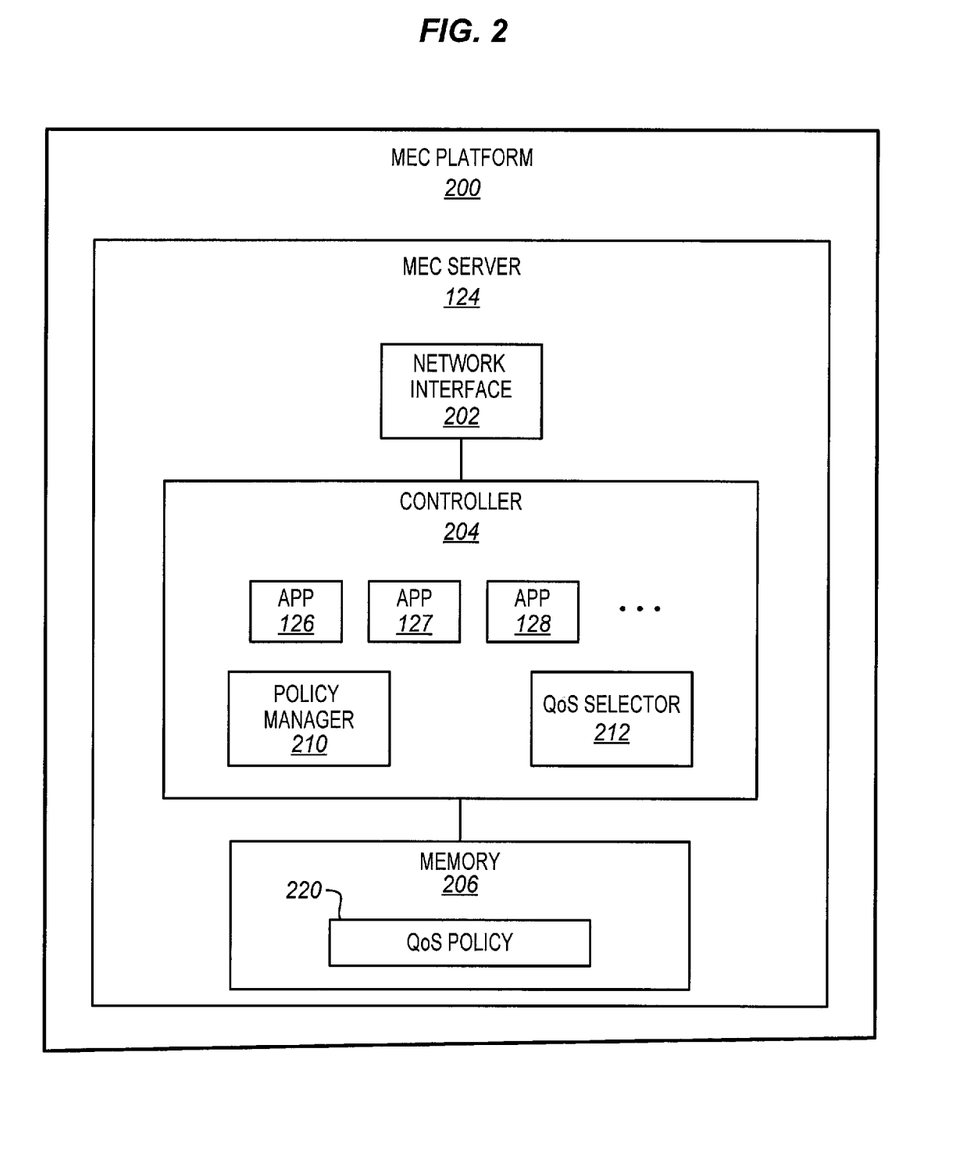
FIG. 2 is a block diagram of a MEC server in an illustrative embodiment.

FIG. 2 is a block diagram of MEC server 124 in an illustrative embodiment. MEC server 124 is implemented on a MEC platform 200. MEC platform 200 refers to a pool of physical resources in RAN 120 that are used to implement MEC server 124 and possibly other MEC servers within RAN 120. MEC platform 200 may include the physical resources of compute resources, storage resources, and network resources.

In this embodiment, MEC server 124 is an apparatus that includes a network interface component 202, a controller 204, and a memory 206. Network interface component 202 is a component (e.g., hardware) configured to communicate with base station 122 (and other base stations of RAN 120) and core network 110. Network interface component 202 may be able to interpret a variety of protocols. Controller 204 represents a component that provides the functions of MEC server 124 through one or more processors or other physical resources. Controller 204 is able to communicate with base station 122 and core network 110 through network interface component 202. Memory 206 is a local computer readable storage medium (e.g., ROM or flash memory) for data, instructions, applications, etc., and is accessible by controller 204. MEC server 124 may include various other components not specifically illustrated in FIG. 2.

Controller 204 implements edge applications 126-128 as well as other edge applications not shown. Edge applications 126-128 are configured to provide MEC services to one or more mobile devices. Some examples of MEC services provided by edge applications 126-128 include smart building services, Internet of Things (IoT) services, Vehicle-to-Infrastructure (V2I) services, Augmented Reality (AR) services, video services, etc. Controller 204 also implements a policy manager 210 and a QoS selector 212. Policy manager 210 is configured to acquire QoS policies for mobile devices from core network 110, and manage the QoS policies. QoS selector 212 is configured to select a QoS profile for a user plane connection between MEC server 124 and a mobile device based on the QoS policy for that mobile device. A further description of policy manager 210 and QoS selector 212 is provided below.

Figure 3:
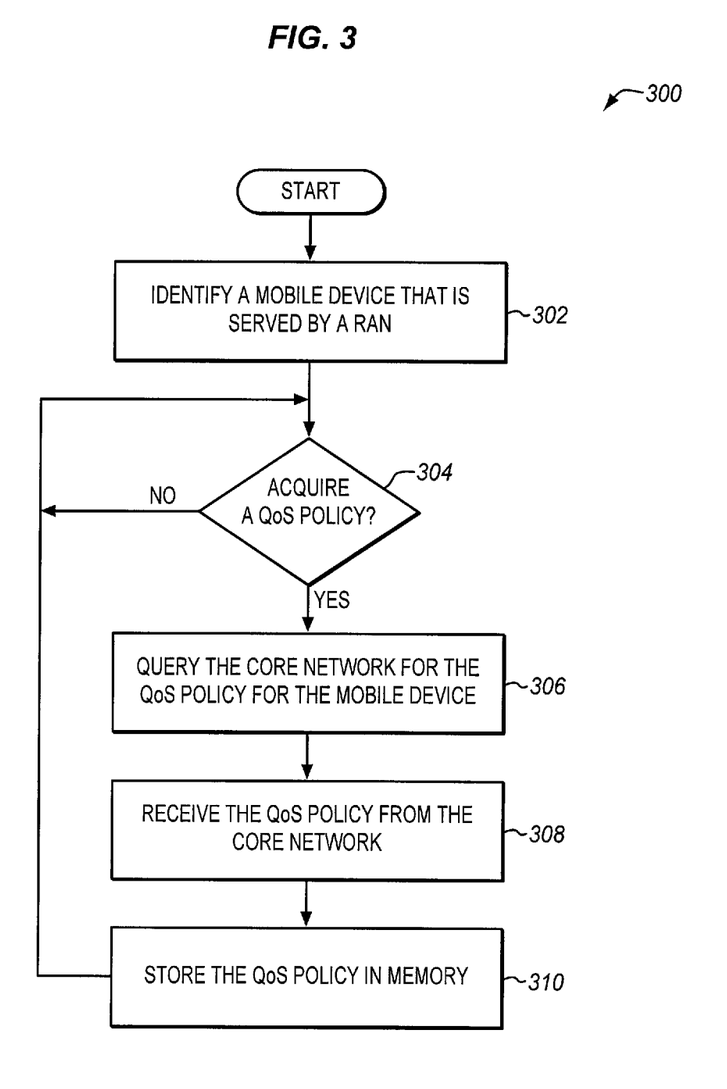
FIG. 3 is a flow chart illustrating a method of acquiring a QoS policy for a mobile device in an illustrative embodiment.

FIG. 3 is a flow chart illustrating a method 300 of acquiring a QoS policy for mobile device 140 in an illustrative embodiment. The steps of method 300 will be described with reference to MEC server 124 in FIGS. 1-2, but those skilled in the art will appreciate that method 300 may be performed in other devices. The steps of the flow charts described herein are not all inclusive and may include other steps not shown, and the steps may be performed in an alternative order.

Policy manager 210 identifies mobile device 140 that is served by RAN 120 (step 302). Policy manager 210 may identify when mobile device 140 attaches to RAN 120, establishes a session, requests/modifies a MEC service, etc. Policy manager 210 may also determine that mobile device 140 is eligible to receive MEC services from MEC server 124. For example, policy manager 210 may acquire a subscriber profile for mobile device 140 (such as from core network 110) when mobile device 140 attaches to RAN 120. Policy manager 210 may process the subscriber profile to determine that mobile device 140 is eligible or has subscribed to MEC services. Policy manager 210 determines whether to acquire a QoS policy for mobile device 140 from core network 110 (step 304). There may be multiple conditions that trigger policy manager 210 to acquire a QoS policy for mobile device 140. For example, if no QoS policy has previously been acquired for mobile device 140, then policy manager 210 makes a determination to acquire a new QoS policy. If a QoS policy has been previously acquired for mobile device 140 but a validity timer for the QoS policy has expired, then policy manager 210 makes a determination to acquire an updated QoS policy. If mobile device 140 is handed over from another RAN/MEC server, then policy manager 210 may make a determination to acquire an updated QoS policy.

Responsive to a determination to acquire a QoS policy for mobile device 140, policy manager 210 queries core network 110 for the QoS policy for mobile device 140 (step 306). A QoS policy is a set of information determined by core network 110 which allows MEC server 124 to select a QoS profile for a user plane connection established for a MEC service. In this embodiment, the QoS policy includes a plurality of QoS profile options for mobile device 140. Policy manager 210 receives the QoS policy from core network 110 (step 308), and stores the QoS policy 220 in memory 206 (step 310). If a previous QoS policy 220 is stored in memory 206, then policy manager 210 may delete the previous QoS policy 220 when storing the newly-received QoS policy 220. Core network 110 or policy manager 210 may assign a validity timer to QoS policy 220, which may be stored in memory 206 along with QoS policy 220. Method 300 then returns to step 304. Thus, policy manager 210 keeps an updated copy of the QoS policy 220 for mobile device 140 in memory 206, which may be used to select QoS profiles for MEC services that are initiated for mobile device 140.

Figure 4:
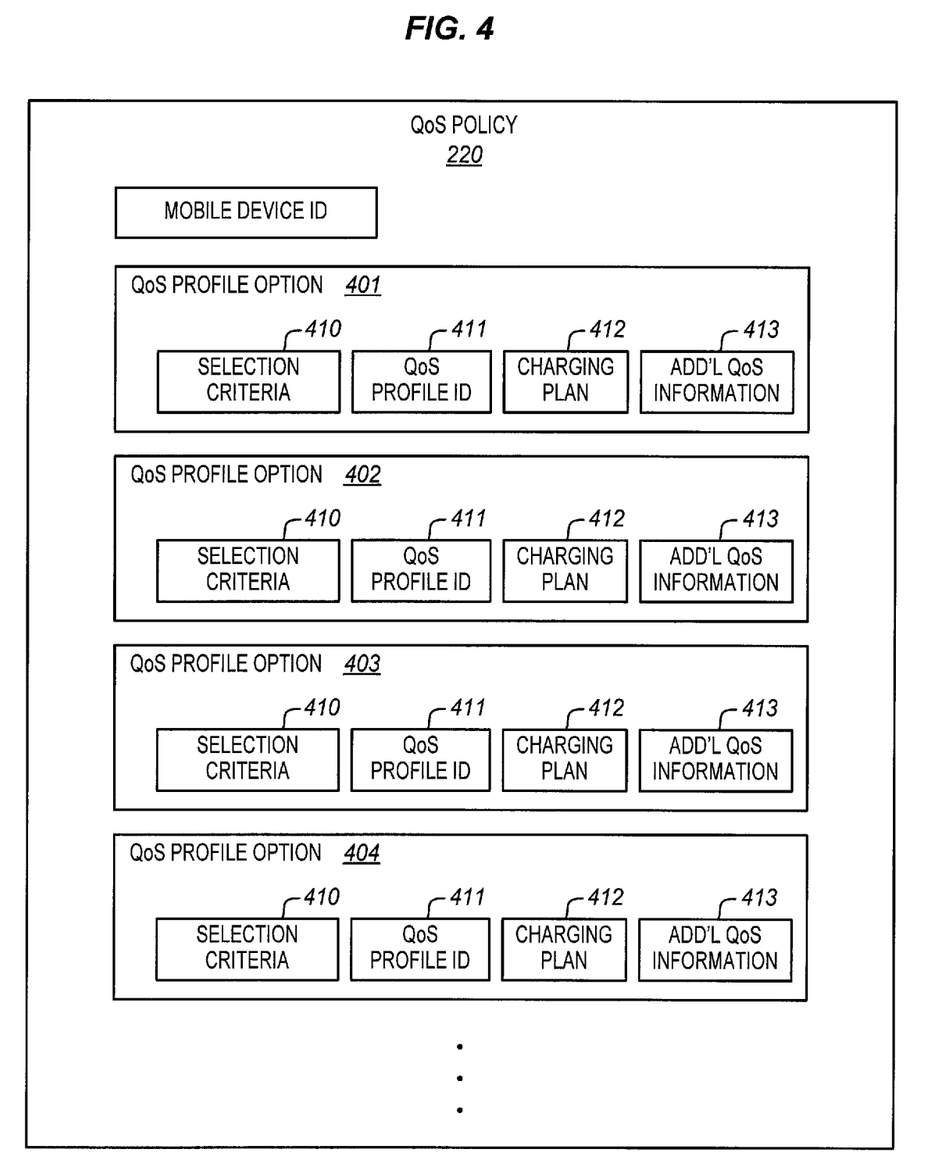
FIG. 4 illustrates a QoS policy in an illustrative embodiment.

FIG. 4 illustrates a QoS policy 220 in an illustrative embodiment. QoS policy 220 may include a mobile device ID for mobile device 140. QoS policy 220 also includes a plurality of QoS profile options 401-404. Each QoS profile option 401-404 is associated with a QoS profile, and may include the following parameters: selection criteria 410, a QoS profile identifier (ID) 411, a charging plan 412, and additional QoS information 413. These parameters indicate one possible example, and QoS profile options 401-404 may include different or additional parameters in other embodiments. The selection criteria 410 are rules, conditions, information, etc., used to select a QoS profile. For example, the selection criteria 410 may include a location of a mobile device, time-of-day/day-of-week, an edge application ID, a MEC service type, network conditions (e.g., MEC server load, RAN usage, etc.), any device information that can be detected by RAN 120 such as UE battery level, etc. The QoS profile ID 411 is mapped to, points to, or is used to indicate a particular QoS profile. The charging plan 412 indicates the charging rate for a QoS profile, and may be static or dynamic. A dynamic charging rate may be based on the selection criteria 410 or other criteria. The additional QoS information 413 may include a special bit rate, notification control parameters, etc.

A QoS profile contains QoS parameters that define the QoS for a user plane connection, such as a QoS ID (e.g., 5QI), an Allocation and Retention Priority (ARP), Guaranteed Flow Bit Rate (GFBR) and Maximum Flow Bit Rate (MFBR) for UL and DL traffic for a Guaranteed Bit Rate (GBR) flow, a Reflective QoS Attribute (RQA) for a non-GBR flow, notification control, etc. The QoS ID references QoS characteristics that describe the packet forwarding treatment for a QoS flow between a mobile device and a MEC server, such as resource type (GBR, delay critical GBR, or Non-GBR), priority level, packet delay budget, packet error rate, and averaging window.

Figure 5:
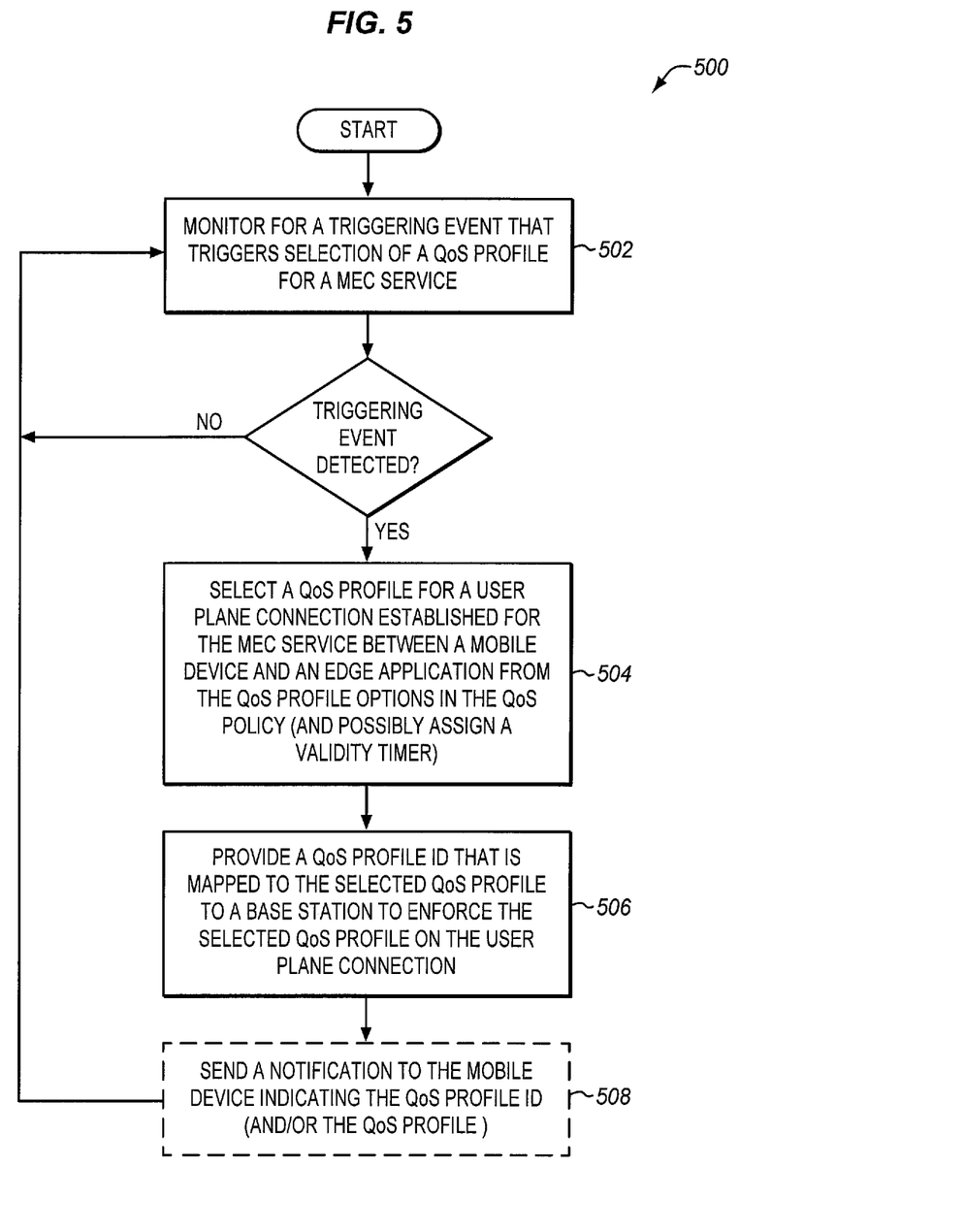
FIG. 5 is a flow chart illustrating a method of selecting a QoS profile for a user plane connection established for a MEC service for a mobile device in an illustrative embodiment.

FIG. 5 is a flow chart illustrating a method 500 of selecting a QoS profile for a user plane connection established for a MEC service for mobile device 140 in an illustrative embodiment. The steps of method 500 will be described with reference to MEC server 124 in FIGS. 1-2, but those skilled in the art will appreciate that method 500 may be performed in other devices.

QoS selector 212 monitors for a triggering event that triggers selection of a QoS profile for a MEC service (step 502). A triggering event may comprise identification of a service request for a MEC service initiated by mobile device 140 or an edge application 126-128 in MEC server 124. A triggering event may comprise expiration of a validity timer assigned to a previously-selected QoS profile. A triggering event may comprise a change in network conditions within RAN 120. A triggering event may comprise a determination that a battery level in mobile device 140 drops below a threshold. A triggering event may comprise a handover of a MEC service from another MEC server/RAN, a change or modification of the MEC service, etc.

In response to detecting a triggering event, QoS selector 212 selects a QoS profile for a user plane connection established for the MEC service between mobile device 140 and an edge application 126-128 from QoS profile options 401-404 in QoS policy 220 (step 504). The QoS profile specifies the QoS parameters to enforce for the user plane connection established for the MEC service. QoS selector 212 processes the selection criteria 410 for the QoS profile options 401-404 to select the QoS profile associated with one of the QoS profile options 401-404. For example, QoS selector 212 may consider the location of mobile device 140, the edge application ID of the edge application 126-128 set to provide the MEC service, the service type of the MEC service (e.g., a video service, an AR service, etc.), load conditions within RAN 120, another other criteria in selecting the QoS profile. QoS selector 212 may also consider the charging plans associated with each of the QoS profile options 401-404 when selecting the QoS profile. QoS selector 212 may also assign a validity timer to the selected QoS profile.

QoS selector 212 then provides a QoS profile ID 411 (e.g., a QoS Flow ID (QFI)), that is mapped to the selected QoS profile, to base station 122 to enforce the selected QoS profile on the user plane connection (step 506). QoS selector 212 may optionally send a notification to mobile device 140 indicating the QoS profile ID (or the QoS profile itself) (step 508) through base station 122. Method 500 then returns to step 502. QoS selector 212 performs method 500 for one or more MEC services between an individual edge application 126-128 and mobile device 140, or for MEC services between multiple edge applications 126-128 and mobile device 140. Thus, QoS selector 212 is tasked with selecting a QoS profile for each MEC service or edge application 126-128 instead of relying on core network 110 to select the QoS profile.

Figure 6:
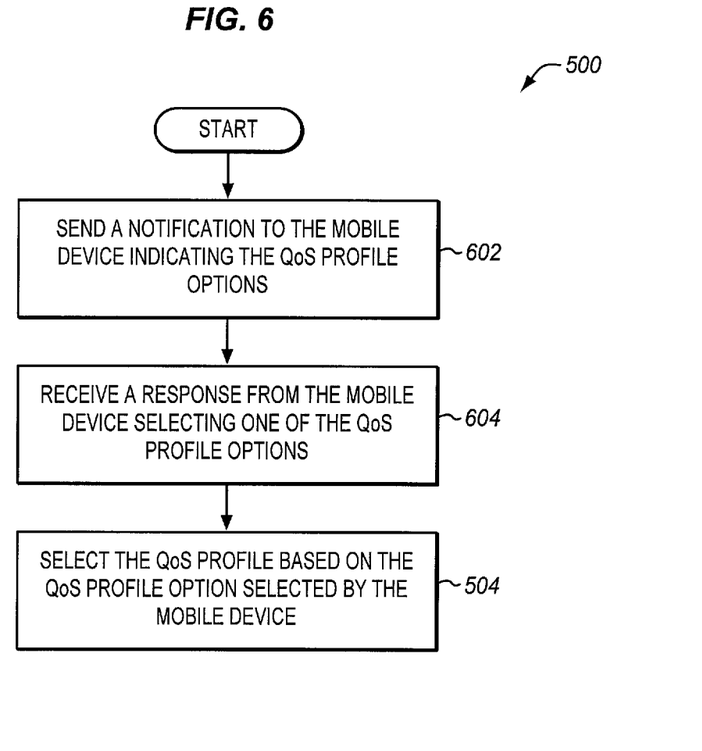
FIG. 6 is a flow chart illustrating additional steps of selecting a QoS profile in an illustrative embodiment.

In one embodiment, QoS selector 212 may interact with mobile device 140 when selecting the QoS profile for a MEC service. FIG. 6 is a flow chart illustrating additional steps of selecting a QoS profile in an illustrative embodiment. The steps shown in FIG. 6 may be performed before or concurrent with step 504 in FIG. 5. QoS selector 212 sends a notification to mobile device 140 indicating the QoS profile options 401-404 (step 602). In response to the notification, mobile device 140 may interact with its end user to select one of the QoS profile options 401-404. QoS selector 212 receives a response from mobile device 140 selecting one of the QoS profile options 401-404 (step 604). QoS selector 212 may then select the QoS profile for the user plane connection established for the MEC service between mobile device 140 and an edge application 126-128 based on the QoS profile option selected by mobile device 140 (step 504). QoS selector 212 is in charge of making the final selection of the QoS profile, but may consider the input from mobile device 140 and its end user when making the final selection.

Figure 7:
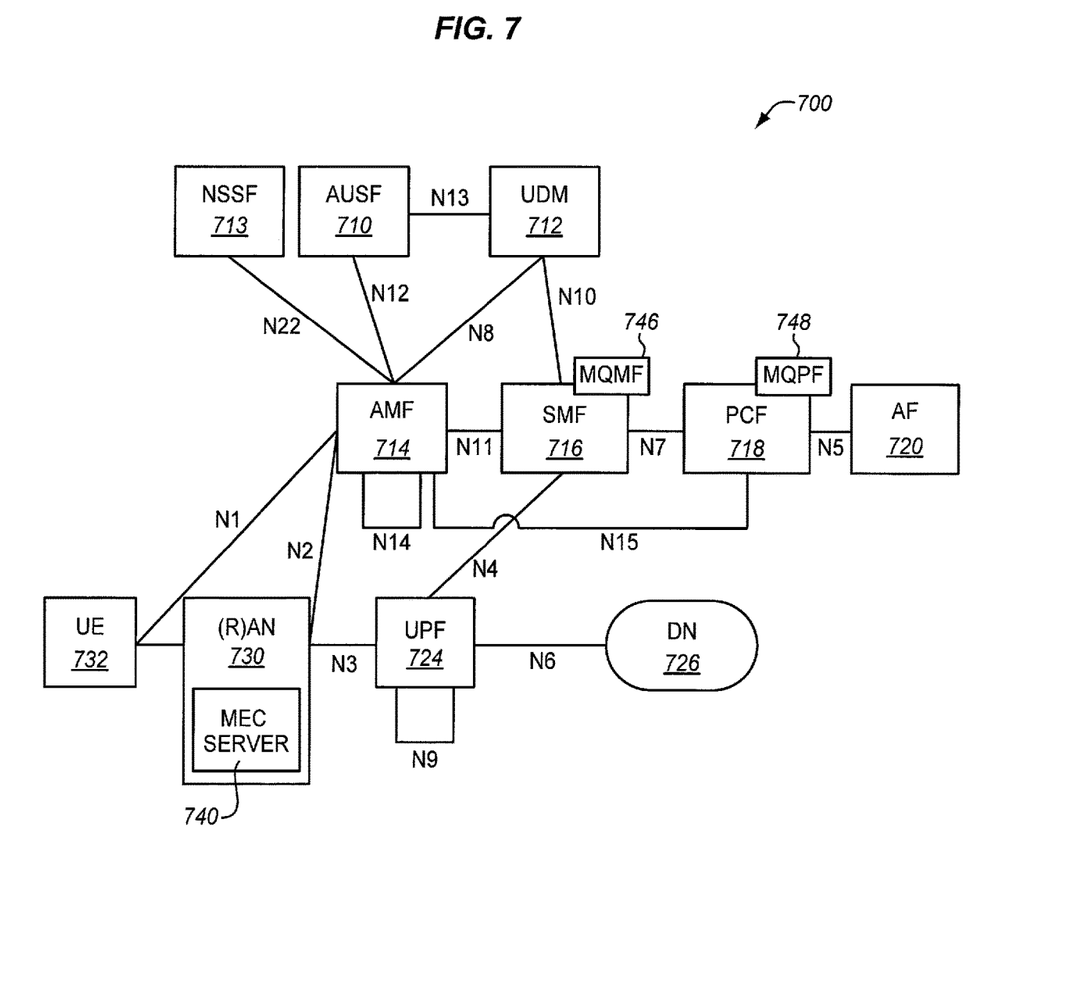
FIG. 7 illustrates a non-roaming architecture of a next generation network in an illustrative embodiment.

FIG. 7 illustrates a non-roaming architecture 700 of a next generation network in an illustrative embodiment. The architecture in FIG. 7 is a reference point representation, as is further described in 3GPP TS 23.501 (version 1.5.0), which is incorporated by reference as if fully included herein. The control plane of architecture 700 includes Authentication Server Function (AUSF) 710, a Unified Data Management (UDM) element 712, a Network Slice Selection Function (NSSF) 713, an Access and Mobility Management Function (AMF) 714, a Session Management Function (SMF) 716, a Policy Control Function (PCF) 718, and an Application Function (AF) 720. The user plane of architecture 700 includes a User Plane Function (UPF) 724 that communicates with a Data Network (DN) 726. A (Radio) Access Network ((R)AN) 730 and User Equipment (UE) 732 are able to access the control plane and the user plane.

AUSF 710 is configured to support authentication of UE 732. UDM element 712 is configured to store subscription data/information for UE 732. UDM element 712 may store three types of user data: subscription, policy, and session-related context (e.g., UE location). AMF 714 is configured to provide UE-based authentication, authorization, mobility management, etc. SMF 716 is configured to provide the following functionality: session management (SM), UE Internet Protocol (IP) address allocation and management, selection and control of UPF 724, termination of interfaces towards PCF 718, control part of policy enforcement and QoS, lawful intercept, termination of SM parts of NAS messages, Downlink Data Notification (DNN), roaming functionality, handle local enforcement to apply QoS for Service Level Agreements (SLAs), charging data collection and charging interface, etc. If UE 732 has multiple sessions, different SMFs may be allocated to each session to manage them individually and possibly provide different functionalities per session. PCF 718 is configured to support a unified policy framework to govern network behavior, and to provide policy rules to control plane functions for QoS enforcement, charging, access control, traffic routing, etc. AF 720 provides information on a packet flow to PCF 718. Based on the information, PCF 718 is configured to determine policies about mobility and session management to make AMF 714 and SMF 716 operate properly.

UPF 724 supports various user plane operations and functionalities, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. DN 726 is not part of the core network, and provides Internet access, operator services, 3rd party services, etc.

Architecture 700 includes the following reference points. The N1 reference point is implemented between UE 732 and AMF 714. The N2 reference point is implemented between (R)AN 730 and AMF 714. The N3 reference point is implemented between (R)AN 730 and UPF 724. The N4 reference point is implemented between the SMF 716 and UPF 724. The N5 reference point is implemented between PCF 718 and AF 720. The N6 reference point is implemented between UPF 724 and DN 726. The N7 reference point is implemented between the SMF 716 and PCF 718. The N8 reference point is implemented between UDM 712 and AMF 714. The N9 reference point is implemented between two UPFs. The N10 reference point is implemented between UDM 712 and SMF 716. The N11 reference point is implemented between AMF 714 and SMF 716. The N12 reference point is implemented between AMF 714 and AUSF 710. The N13 reference point is implemented between UDM 712 and AUSF 710. The N14 reference point is implemented between two AMFs. The N15 reference point is implemented between PCF 718 and AMF 714 in the case of a non-roaming scenario. The N22 reference point is implemented between NSSF 713 and AMF 714.

In this embodiment, MEC services are provided within architecture 700. For the MEC services, a MEC server 740 is implemented at (R)AN 730, a MEC QoS Management Function (MQMF) 746 is implemented at SMF 716, and a MEC QoS Policy Function (MQPF) 748 is implemented at PCF 718. MEC server 740 provides MEC services through edge applications running on MEC server 740. MEC server 740 is also in charge of selecting QoS profiles for MEC services/edge applications that are serving UE 732. MQPF 748 is introduced on PCF 718, and is configured to generate a MEC QoS policy for UE 732. The MEC QoS policy includes QoS profile options for UE 732, and each QoS profile option may include a MEC QoS Flow ID (QFI), conditions of applying this QFI, a charging plan for the QFI, etc. MQPF 748 may be triggered by SMF 716 in a scenario such as PDU session establishment/modification, location change of UE 732, MEC service update, etc. MQPF 748 provides the MEC QoS policy to MQMF 746.

MQMF 746 is introduced on SMF 716, and is configured to manage the MEC QoS policy for UE 732. MQMF 746 may update or modify the MEC QoS policy based on a UE profile from UDM 712 and local provisioning. MQMF 746 provides the MEC QoS policy to MEC server 740/(R)AN 730 in the scenarios such as when UE 732 attaches to (R)AN 730 for MEC services, upon PDU session establishment, at QoS flow establishment or modification, etc.

Figure 8:
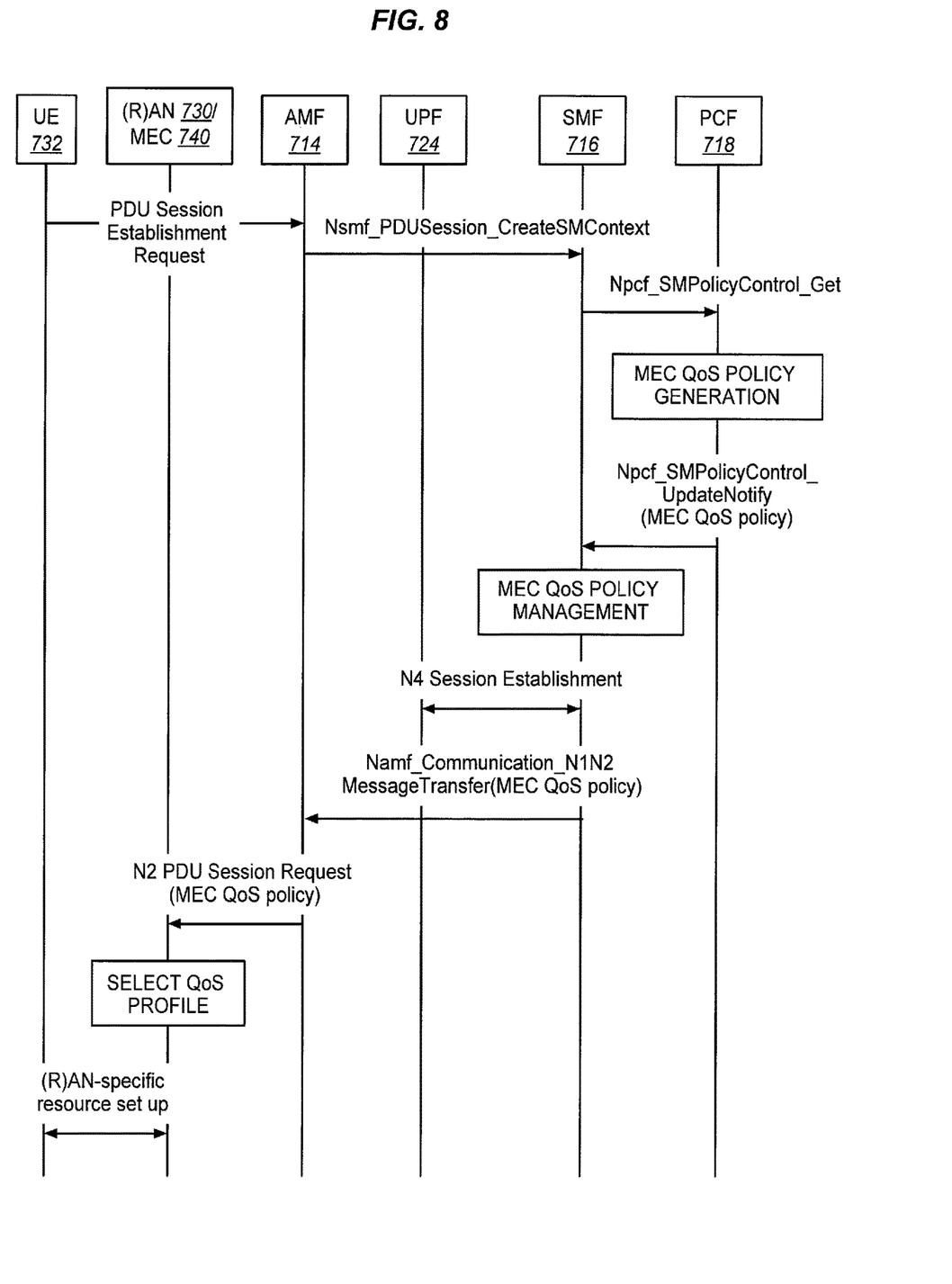
FIG. 8 is a signaling diagram illustrating MEC QoS control in an illustrative embodiment.

FIG. 8 is a signaling diagram illustrating MEC QoS control in an illustrative embodiment. The scenario shown in FIG. 8 is for PDU session establishment. However, similar signaling may occur for scenarios, such as MEC session establishment/modification procedures, UE attach procedures, etc. In order to establish a new PDU session, UE 732 generates a new PDU session ID. UE 732 initiates the UE-requested PDU session establishment procedure by the transmission of a NAS message containing a PDU Session Establishment Request within the N1 SM container. The Request Type indicates "Initial request" if the PDU Session Establishment is a request to establish a new PDU session and indicates "Existing PDU Session" if the request refers to an existing PDU session between 3GPP access and non-3GPP access or to an existing PDN connection in EPC. The NAS message sent by UE 732 is encapsulated by (R)AN 730 in a N2 message towards AMF 714 that should include User location information and Access Technology Type Information.

AMF 714 determines that the message corresponds to a request for a new PDU session based on the Request Type indicating an "initial request" and that the PDU Session ID is not used for any existing PDU session(s) of UE 732. AMF 714 selects an SMF 716, and sends an Nsmf_PDUSession_CreateSMContext Request (SUPI or PEI, DNN, S-NSSAI, PDU Session ID, AMF ID, Request Type, N1 SM container (PDU Session Establishment Request), User location information, Access Type, PEI, GPSI) to SMF 716. SMF 716 checks the validity of UE 732, and determines whether the UE request is compliant with the user subscription and with local policies, and whether the UE is located within the LADN service area based on the UE location reporting from AMF 714. If SMF 716 is able to process the PDU Session establishment request, then SMF 716 creates an SM context and responds to AMF 714 with an Nsmf_PDUSession_CreateSMContext Response(Cause, SM Context ID or N1 SM container (PDU Session Reject(Cause))). If dynamic Policy and Charging Control (PCC) is deployed, then SMF 716 performs PCF selection. SMF 716 may invoke the Npcf_SMPolicyControl_Get operation to establish a PDU session with PCF 718 and get the default PCC Rules for the PDU session from PCF 718. Responsive to the Npcf_SMPolicyControl_Get, MQPF 748 at PCF 718 triggers to generate the MEC QoS policy for UE 732, along with any other PCC rules for UE 732. PCF 718 then sends the MEC QoS policy to SMF 716 by invoking the Npcf_SMPolicyControl_UpdateNotify service operation. MQMF 716 at SMF 716 is triggered to manage the MEC QoS policy based on the UE profile, local provisioning, etc. SMF 716 sends an N4 Session Establishment/Modification Request to UPF 724 and provides packet detection, enforcement, and reporting rules to be installed on UPF 724 for this PDU Session. UPF 724 acknowledges by sending an N4 Session Establishment/Modification Response. SMF 716 also sends the MEC QoS policy to AMF 714 in a message, such as an Namf_Communication_N1N2MessageTransfer (PDU Session ID, Access Type, N2 SM information (PDU Session ID, QoS Profile(s), CN Tunnel Info, S-NSSAI, Session-AMBR, PDU Session Type), N1 SM container (PDU Session Establishment Accept (QoS Rule, SSC mode, S-NSSAI, allocated IPv4 address, interface identifier, Session-AMBR, PDU Session Type))) to AMF 714. AMF 714 then sends the MEC QoS policy to MEC server 740 in (R)AN 730 in a message, such as an N2 PDU Session Request. MEC server 740 then stores the MEC QoS policy.

With the MEC QoS policy, MEC server 740 monitors for a triggering event that triggers selection of a QoS profile for a MEC service, such as a service request for a MEC service initiated by UE 732 or an edge application in MEC server 740. In response to detecting a triggering event, MEC server 740 selects a QoS profile for a user plane connection established for the MEC service between UE 732 and an edge application on MEC server 740 based on the MEC QoS policy. For example, MEC server 740 may consider the location of UE 732, the edge application ID of the edge application set to provide the MEC service, the service type of the MEC service (e.g., a video service, an AR service, etc.), load conditions within (R)AN 730, charging plans associated with each QoS profile, etc. MEC server 740 then enforces the selected QoS profile by providing the QFI that is mapped to the selected QoS profile to a base station in (R)AN 730. MEC server 740 may optionally send the QoS profile ID (or the QoS profile itself) to UE 732.

Figure 9:
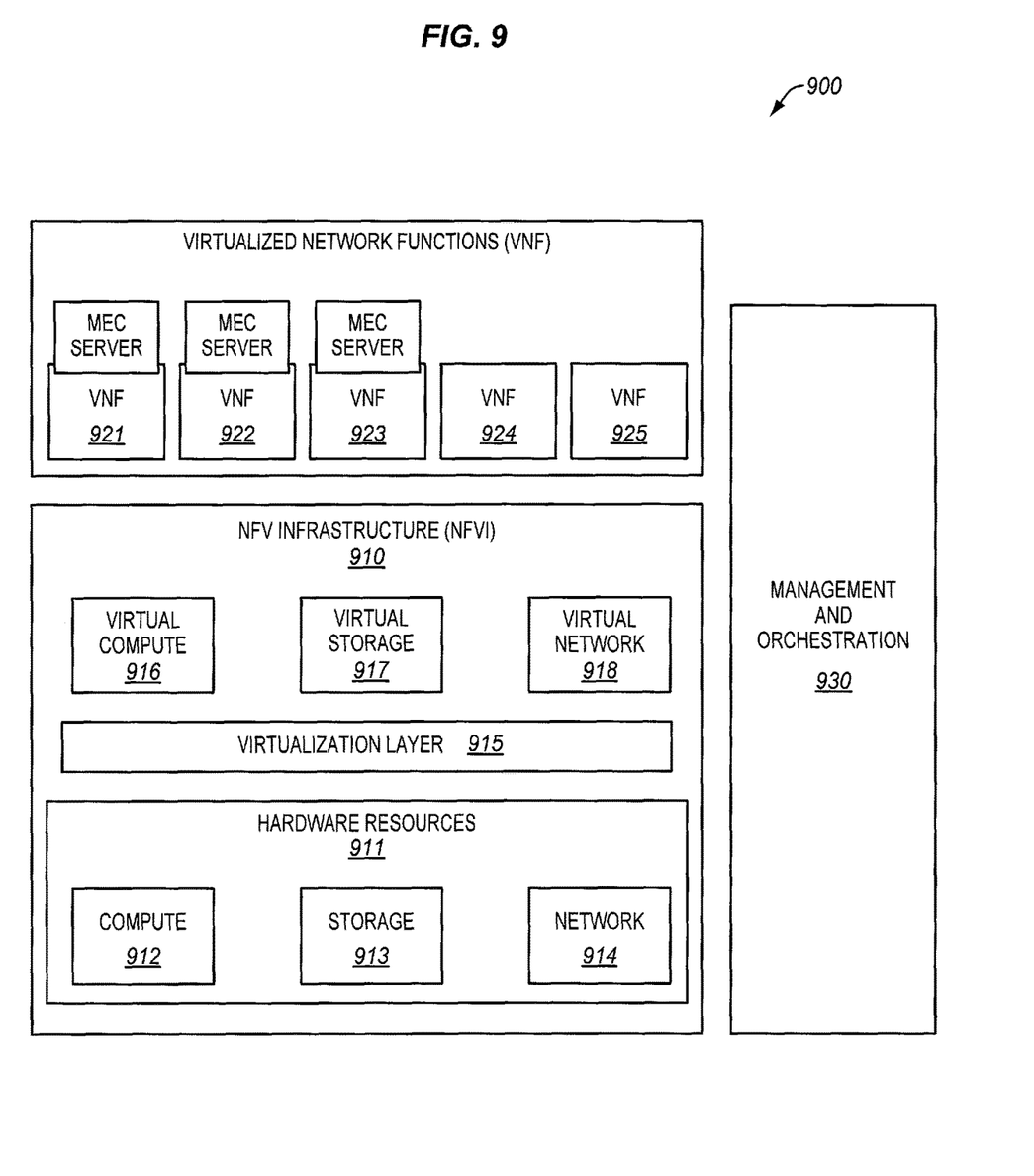
FIG. 9 illustrates a network architecture in an illustrative embodiment.

In one embodiment, the MEC platform (e.g., MEC platform 200) for a MEC server (e.g., MEC server 124) may be implemented with a virtualized architecture. FIG. 9 illustrates a network architecture 900 in an illustrative embodiment. Network architecture 900 uses Network Functions Virtualization (NFV), which is a concept that virtualizes classes of network node functions into building blocks that may connect or chain together to create communication services, which are MEC services in this embodiment. Architecture 900 includes an NFV infrastructure 910, which includes hardware resources 911, such as compute resources 912, storage resources 913, and network resources 914. NFV infrastructure 910 also includes a virtualization layer 915, which is able to create virtual compute resources 916, virtual storage resources 917, and virtual network resources 918.

Architecture 900 also includes Virtualized Network Functions (VNFs) 921-925. Each VNF 921-925 may comprise one or more virtual machines (VM) running different software and processes on top of NFV infrastructure 910. A VM is an operating system or application environment that is installed on software which imitates dedicated hardware. Specialized software called a hypervisor emulates a CPU, memory, hard disk, network, and/or other hardware resources, which allows the virtual machines to share the hardware resources. Each VNF 921-925 described herein performs one or more network functions. A network function is a "well-defined functional behavior" within a network, such as firewalling, Domain Name System (DNS), caching, network address translation (NAT), etc. Individual VNFs may be linked or chained together in a way similar to building blocks to offer a full-scale networking communication service.

Architecture 900 also includes management and orchestration layer 930. Management and orchestration layer 930 provides for planned automation and provisioning tasks within the virtualized environment. The tasks of orchestration include configuration management of compute resources 912, storage resources 913, and network resources 914. The tasks of orchestration also include provisioning of VMs and application instances, such as for VNFs 921-925. The tasks of orchestration may also include security and compliance assessment, monitoring, and reporting. In this embodiment, one or more of VNFs 921-925 may be implemented as a MEC server that implements one or more edge applications.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A system comprising:
a Mobile Edge Computing (MEC) server implemented at a Radio Access Network (RAN) of a mobile network that includes a base station, the MEC server comprising:
a memory; and
a controller configured to implement at least one edge application configured to provide MEC services to a mobile device in range of the base station;
the controller is configured to implement a policy manager configured to query a core network of the mobile network for a Quality of Service (QoS) policy for the mobile device that indicates a plurality of QoS profile options for the mobile device, to receive the QoS policy from the core network, and to store the QoS policy in the memory;
the controller is configured to implement a QoS selector configured to monitor for a triggering event that triggers selection of a QoS profile, to select the QoS profile from the QoS profile options for a user plane connection established for a MEC service between the mobile device and the at least one edge application in response to the triggering event, and to provide a QoS profile identifier for the QoS profile to the base station to enforce the QoS profile on the user plane connection.

2. The system of claim 1 wherein:
the QoS selector is configured to assign a validity timer to the QoS profile.

3. The system of claim 2 wherein:
the triggering event comprises expiration of the validity timer for a previously-selected QoS profile.

4. The system of claim 1 wherein:
the triggering event comprises a change in network conditions within the RAN.

5. The system of claim 1 wherein:
the triggering event comprises a determination in the QoS selector that a battery level in the mobile device drops below a threshold.

6. The system of claim 1 wherein:
the QoS selector is configured to send a notification to the mobile device indicating the QoS profile identifier.

7. The system of claim 1 wherein:
the QoS selector is configured to send a notification to the mobile device indicating the QoS profile options, to receive a response from the mobile device selecting one of the QoS profile options, and to select the QoS profile based on the one of the QoS profile options selected by the mobile device.

8. A method operable in a Mobile Edge Computing (MEC) server implemented at a Radio Access Network (RAN) of a mobile network that includes a base station, wherein the MEC server implements at least one edge application configured to provide MEC services to a mobile device in range of the base station, the method comprising:
querying a core network of the mobile network for a Quality of Service (QoS) policy for the mobile device that indicates a plurality of QoS profile options for the mobile device;
receiving the QoS policy from the core network;
storing the QoS policy in the memory;
monitoring for a triggering event that triggers selection of a QoS profile;
selecting the QoS profile from the QoS profile options for a user plane connection established for a MEC service between the mobile device and the at least one edge application in response to the triggering event; and
providing a QoS profile identifier for the QoS profile to the base station to enforce the QoS profile on the user plane connection.

9. The method of claim 8 further comprising:
assigning a validity timer to the QoS profile.

10. The method of claim 9 wherein:
the triggering event comprises expiration of the validity timer for a previously-selected QoS profile.

11. The method of claim 8 wherein:
the triggering event comprises a change in network conditions within the RAN.

12. The method of claim 8 wherein:
the triggering event comprises a determination that a battery level in the mobile device drops below a threshold.

13. The method of claim 8 further comprising:
sending a notification to the mobile device indicating the QoS profile identifier.

14. The method of claim 8 wherein selecting the QoS profile comprises:
sending a notification to the mobile device indicating the QoS profile options;
receiving a response from the mobile device selecting one of the QoS profile options; and
selecting the QoS profile based on the one of the QoS profile options selected by the mobile device.

15. A non-transitory computer readable medium embodying programmed instructions executed by one or more processors, wherein the instructions direct the processors to implement:
a Mobile Edge Computing (MEC) server implemented at a Radio Access Network (RAN) of a mobile network that includes a base station;
the MEC server implements at least one edge application configured to provide MEC services to a mobile device in range of the base station;
the MEC server queries a core network of the mobile network for a Quality of Service (QoS) policy for the mobile device that indicates a plurality of QoS profile options for the mobile device, receives the QoS policy from the core network, and stores the QoS policy in the memory;
the MEC server monitors for a triggering event that triggers selection of a QoS profile, selects the QoS profile from the QoS profile options for a user plane connection established for a MEC service between the mobile device and the at least one edge application in response to the triggering event, and provides a QoS profile identifier for the QoS profile to the base station to enforce the QoS profile on the user plane connection.

16. The computer readable medium of claim 15 wherein:
the MEC server assigns a validity timer to the QoS profile.

17. The computer readable medium of claim 16 wherein:
the triggering event comprises expiration of the validity timer for a previously-selected QoS profile.

18. The computer readable medium of claim 15 wherein:
the triggering event comprises a change in network conditions within the RAN.

19. The computer readable medium of claim 15 wherein:
the triggering event comprises a determination that a battery level in the mobile device drops below a threshold.

20. The computer readable medium of claim 15 wherein:
the MEC server sends a notification to the mobile device indicating the QoS profile options, receives a response from the mobile device selecting one of the QoS profile options, and selects the QoS profile based on the one of the QoS profile options selected by the mobile device.

* * * * *